(12) United States Patent
Kunimoto et al.

(10) Patent No.: US 8,408,803 B2
(45) Date of Patent: Apr. 2, 2013

(54) ULTRATHIN CROSS-ROLLER BEARING

(75) Inventors: Kazumasa Kunimoto, Mino (JP);
Yoshihiro Yoshida, Mino (JP)

(73) Assignee: Nippon Thompson Co., Ltd., Tokyo (JP)

( * ) Notice: Subject to any disclaimer, the term of this patent is extended or adjusted under 35 U.S.C. 154(b) by 423 days.

(21) Appl. No.: 12/470,748

(22) Filed: May 22, 2009

(65) Prior Publication Data
US 2009/0297081 A1 Dec. 3, 2009

(30) Foreign Application Priority Data

May 27, 2008 (JP) .................. 2008-137626

(51) Int. Cl.
*F16C 19/50* (2006.01)
*F16C 19/40* (2006.01)
(52) U.S. Cl. ...................... 384/447; 384/551
(58) Field of Classification Search .................. 384/447,
384/456, 470, 507, 508, 520, 551, 559, 560,
384/584
See application file for complete search history.

(56) References Cited

U.S. PATENT DOCUMENTS

| 2,697,644 | A | * | 12/1954 | Zeilman | 384/520 |
|---|---|---|---|---|---|
| 3,208,806 | A | * | 9/1965 | Grolmann et al. | 384/520 |
| 4,479,683 | A | * | 10/1984 | Kanamaru | 384/619 |
| 4,606,654 | A | * | 8/1986 | Yatsu et al. | 384/447 |
| 4,961,653 | A | * | 10/1990 | Suzuki et al. | 384/447 |
| 5,026,177 | A | * | 6/1991 | Masuda | 384/447 |
| 5,033,873 | A | * | 7/1991 | Suzuki | 384/447 |
| 5,441,350 | A | * | 8/1995 | Fujita | 384/447 |
| 7,249,892 | B2 | * | 7/2007 | Takemura et al. | 384/450 |
| 7,478,479 | B2 | * | 1/2009 | Ohno | 384/559 |
| 7,478,948 | B2 | * | 1/2009 | Noda | 378/193 |
| 7,547,144 | B2 | * | 6/2009 | Kunimoto et al. | 384/447 |

FOREIGN PATENT DOCUMENTS

| JP | 2001099144 | 10/2001 |
|---|---|---|
| JP | 2005180578 | 7/2005 |

\* cited by examiner

*Primary Examiner* — James Pilkington
(74) *Attorney, Agent, or Firm* — Browdy and Neimark, PLLC

(57) ABSTRACT

An ultrathin cross-roller bearing composed of outer and inner rings, more than one roller rolling through between the outer and inner rings, and a separator interposed between any two adjoining rollers. With the ultrathin cross-roller bearing constructed as stated earlier, the separator lying between the adjoining rollers is in the form of right cylinder better for keeping constantly the roller in proper posture, getting the bearing itself downsized and lightweight as small as possible, and further making sure of positive lubrication. The outer and inner rings are each made into one-piece construction. The inner ring has an inside diameter in a range of from 20 mm to 50 mm. The roller used in the ultrathin cross-roller bearing has a diameter of 2 mm to render a transverse section given by a product of a radial height and a bearing width in transverse section small or ultrathin in thickness.

1 Claim, 5 Drawing Sheets (A)

(B)

ULTRATHIN CROSS-ROLLER BEARING

FIELD OF THE INVENTION

The present invention relates generally to a cross-roller bearing having outer and inner rings and more than one rolling element or cylindrical roller whose axis is tilted alternately in opposite direction to each other and, more particularly, a cross-roller bearing with more than one roller which gets minimized in diameter to render overall the roller bearing ultrathin in thickness as well as ultralight in weight.

BACKGROUND OF THE INVENTION

Roller bearings of the type called cross-roller bearing because the rollers are arranged in circular direction in a fashion any the adjacent rollers are alternately tilt in opposite direction to each other in recent years have been increasingly incorporated in swiveling and/or rocking components of a variety of machinery including industrial robots, machine tools, medical appliances, optical instruments, and so on. Thus, various cross-roller bearings different in style, construction and size have been developed commercially in conformity with their usage and have done more to make the machines and instruments miniature as well as lightweight.

Of some commonly-assigned Japanese patent applications concerned with rolling-contact bearings, the commonly-assigned Japanese Laid-Open Patent Application 2005-180 578 discloses a cross-roller bearing with plug and production thereof in which inner and outer rings each are made in an one-piece construction and combined with each other to define a race between them, the outer ring having an opening to introduce rollers into the race, and a plug to fit into the opening after introduction of the rollers into race, thereby sealing up the opening. The cross-roller bearing constructed as stated just earlier has rigidity or stiffness enough to bear against revolutions at high speed following up high-speed turning of the machines without getting jarred. The cross-roller bearing is also easier to manufacture with accuracy. Moreover, the outer ring has an oil hole to feed the raceway with lubricant.

Disclosed for example in Japanese Laid-Open Patent Application 2001-99 144 is another example of the thin rolling-contact bearing, which is suited for use in the articulations of robot arms. The prior bearing is envisaged getting easily downsized, easier and cost-saving in machining of parts or members of the articulations to fit the bearing into there. With the prior thin rolling-contact bearing recited just above, the inner and outer rings are set to have the largest radial widths, respectively, which are each 1.5 times or more as large as the maximum axial thickness of them to make it possible to ensure high rigidity in the bearing irrespective of reduction in axial thickness. The large radial widths of the inner and outer rings can afford to provide ample spaces around the circular inside edge of the inner ring and the circular outside edge of the outer ring to have some holes that are used to fasten the bearing to any other member or component, getting unnecessary any conventional housing to support a shaft fitted into the inner ring while accommodate the outer ring, thereby contributing to compactness and cost-saving of the bearing. Moreover, there is no retainer or separator to space balls that fit for rolling movement into the annular raceway defined between the inner and outer rings.

With the prior cross-roller bearing with plug recited above, nevertheless, there is a practical issue in downsizing or reduction as the inner and outer rings both made thicker in size. Next, the thin rolling-contact bearing constructed as stated earlier, although most convenient for simple usage as the rolling elements are balls, is unfit for revolution with high turning accuracy and also insufficient for smooth turning performance with permitting different loads or composite loads.

Modern advanced machines including industrial robots, optical instruments, medical appliances, and so on are increasingly needed to be nimble in their operations even with more downsized than ever. For instance, the bearing to support a robot arm for swiveling movement around the pivot is required having such rigidity or stiffness that permits any load weighed at the top of the arm, or every load different in the direction of moment. Moreover, the parts or members to be incorporated into the swiveling and/or rocking components are desired to be most compact or most lightweight to keep the inertia weight of the arm less. To cope with this, selection of the cross-roller bearing is preferred.

The modern articulations of the robot arms which desires the bearing having the inner ring of 50 mm or less in inside diameter, however, hope to find the cross-roller bearing more compact and lightweight than ever into the ultrathin construction.

SUMMARY OF THE INVENTION

The present invention has as its principal object to overcome the challenges stated earlier and, in particular, to provide a cross-roller bearing in which the rolling element is a miniature roller having a diameter of 2 mm while a separator is interposed between any two adjoining rollers and correspondingly, inner and outer rings have ultrathin construction in conformity with the miniature roller, and further the roller together with the separator is introduced with ease into a circular track or load race defined between raceway surfaces of the inner and outer rings, the separator lying between any two adjoining rollers having a configuration of right cylinder that is most adequate to keep certainly the roller at desired position to run with smoothness throughout the circular race.

The present invention is concerned with an ultrathin cross-roller bearing; comprising an outer ring made on, an inside circular surface thereof with a raceway surface of V-shape in transverse section, an inside ring made on an outside circular surface thereof with a raceway surface of V-shape in transverse section in opposition to the raceway surface of the outer ring, the inner ring lying inside the outer ring for circular movement relatively to the outer ring, more than one roller inserted through a loading hole, which is made in the outer ring, into between the opposed raceway surfaces in a fashion any two adjacent rollers are oblique oppositely each other with their own axes intersecting one another at right angles, and a separator interposed between any two adjacent rollers, wherein the outer and inner rings are each made into one-piece construction; wherein the roller has an axial length and a diameter, which are substantially identical with one another; wherein a radial height in transverse section of the bearing referring to a half a dimension between an outside diameter of the outer ring and an inside diameter of the inner ring is substantially 5.5 mm; and wherein the outer ring is larger in thickness than the inner ring.

In one aspect of the present invention, an ultrathin cross-roller bearing is disclosed in which a clearance parallel to a half a dimension between an inside diameter of the outer ring and an outside diameter of the inner ring is substantially 0.6 mm in width.

In another aspect of the present invention, an ultrathin cross-roller bearing is disclosed in which the separator takes a form of right cylinder large in axial length enough to get rid of any wobbling or varying in posture while rolling through between the raceway surfaces of the outer and inner rings, and further the separator has axially opposite circular corners where axially opposite ends join with a circular outside surface at right angles. In a further another aspect of the present invention there is disclosed an ultrathin cross-roller bearing in which the axially opposite ends of the separator each have at middle areas thereof recesses surrounded with annular flat areas, the recesses functioning as lubricant reservoirs.

In another aspect of the present invention, an ultrathin cross-roller bearing is disclosed in which the inner ring has an inside diameter in a range of from 20 mm to 50 mm while the roller has a diameter of 2 mm and a transverse section given by a product of a radial height and a bearing width in transverse section of the bearing is thin in thickness. In another aspect of the present invention, there is disclosed an ultrathin cross-roller bearing in which the mating outer and inner rings are 5 mm in bearing width, and the transverse section given by the product of the radial height and then axial width in transverse section of the bearing is substantially 27.5 mm$^2$. In a further another aspect of the present invention, there is disclosed an ultrathin cross-roller bearing in which the outer ring is 1.4 times as thick as the inner ring, and wherein a plug fits into the loading bore in the outer ring and the plug is fixedly secured to the outer ring by means of a locking pin.

In another aspect of the present invention, there is disclosed an ultrathin cross-roller bearing which is used in swiveling and/or rocking components of any one of robots, optical instruments, medical appliances, and machine tools.

With the ultrathin cross-roller bearing in which the outer and inner rings are each made into one-piece construction as stated earlier, it is easier to make the outer and inner rings more compact and ultrathin in thickness and, correspondingly, the roller more slender in diameter may be used to get the cross-roller bearing as a whole lightweight and miniature in size. The less in size and weight the cross-roller bearing, the less the inertial mass in the swiveling and/or rocking components in which the ultrathin cross-roller bearing is used of machines such as industrial robots, optical instruments, medical appliances, machine tools, and so on. If that happens, the machines can respond to movement much faster. In addition to the outer and inner rings downsized as stated earlier, the separator to be interposed between the adjoining rollers has a configuration of right cylinder effective in keeping the roller against toppling or wobbling in posture. Especially, the right cylinder has axially opposite circular edges where axially opposite ends meet a circular side surface at right angles, instead of chamfered, to help keep positively the rollers in their proper posture while rolling through the race between the outer and inner rings, thereby permitting the rollers to bear various loads while rolling with smoothness. The circular recesses made on the axially opposite end of the separator make certain of better sliding contact with the rollers irrespective of working orientation or posture of the bearing including a tilted posture, another posture lying on its side, and so on. Moreover, the recesses on the axially opposite end of the separator keep a reserve of lubricant to ensure positive and better lubrication of the rollers, contributing to antifriction bearing operation.

DETAILED DESCRIPTION OF THE PREFERRED EMBODIMENTS

The ultrathin cross-roller bearing according to the present invention is the most lightweight and more compact or downsized in construction than ever to find extensive applications in relative sliding, rocking and turning systems used in a diversity of machinery including industrial robots, optical instruments, medical appliances, machine tools, various assembling machines, semiconductor fabricating equipment, measurement equipments and so on, which requires slim construction, high stiffness and turning accuracy of the bearings. With the ultrathin cross-roller bearing of the present invention, especially, the inner and outer rings whose width and thickness are slim or thin are each made in one-piece construction while the inside diameter of the bearing is set in a range of 20~50 mm. The cross-roller bearing constructed according to the present invention is envisages having better response even with most lightweight.

A preferred first embodiment of the ultrathin cross-roller bearing, called simply "cross-roller bearing" hereinafter, of the present invention will be explained in detail with reference to the accompanying drawings.

Figure 1:
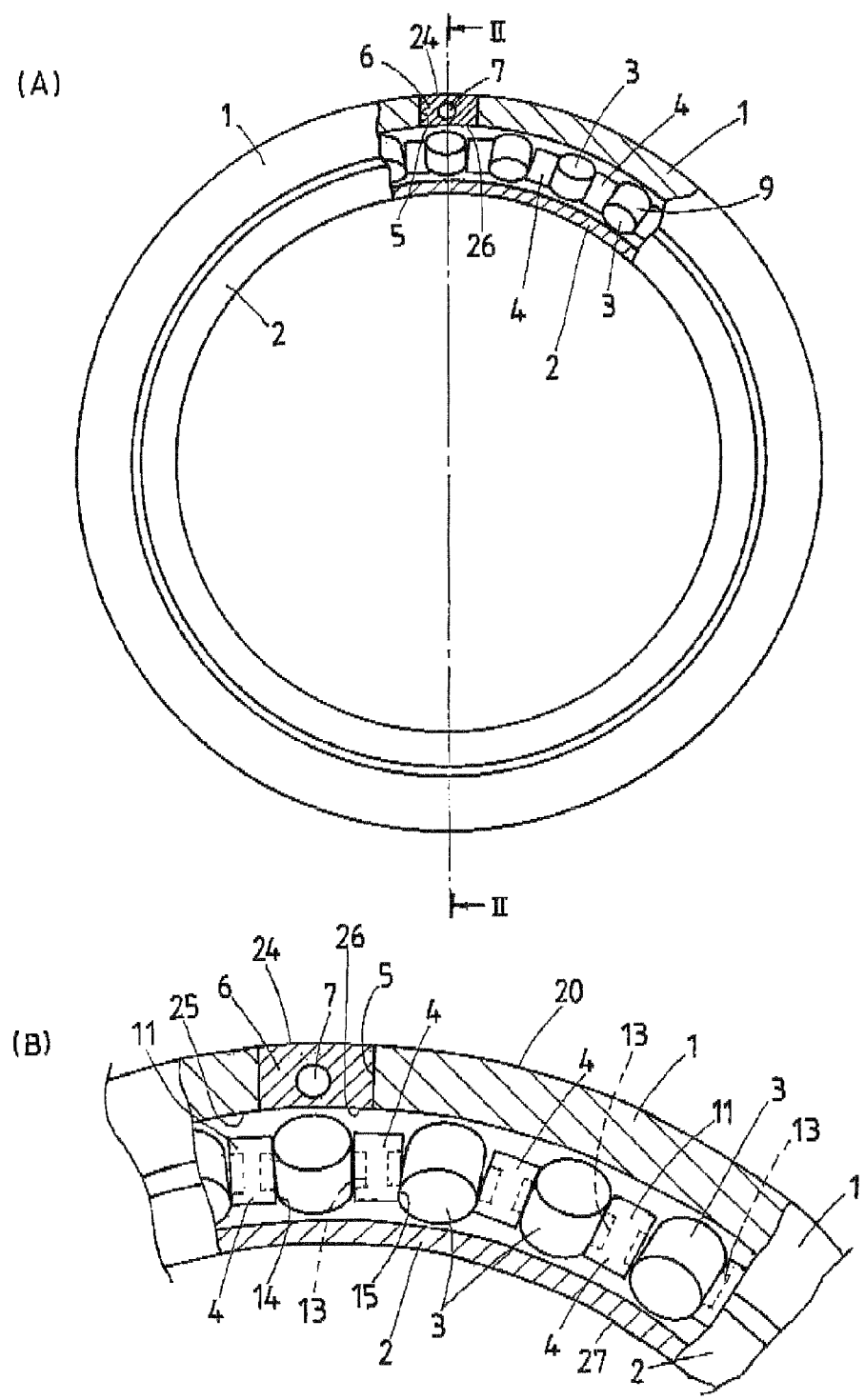
FIG. 1 is a partially cutaway view in front elevation of a preferred embodiment of an ultrathin cross-roller bearing according to the present invention, in which (A) is a front elevation showing overall the ultrathin cross-roller bearing, and (B) is an enlarged fragmentary view in front elevation of the ultrathin cross-roller bearing.
Figure 2:
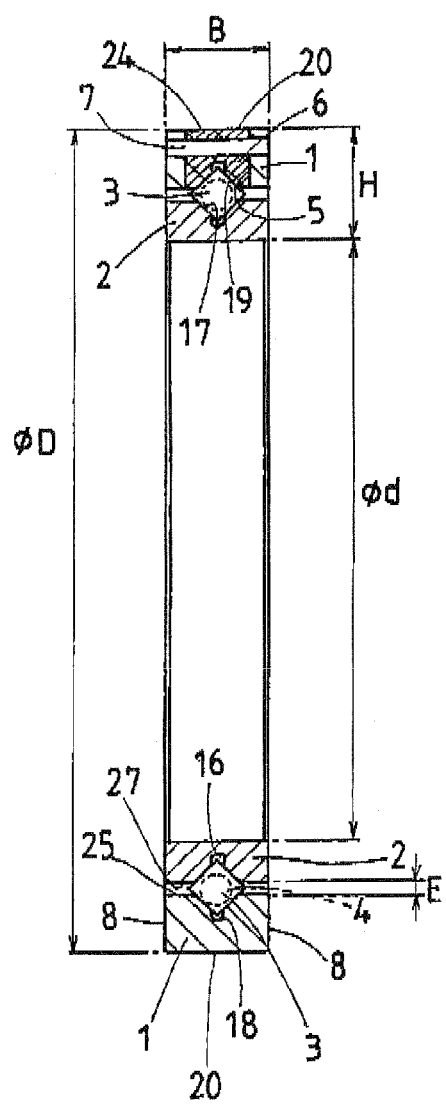
FIG. 2 is a transverse section of the ultrathin cross-roller bearing, taken on the plane lying on the lines II-II FIG. 1.

Referring to FIGS. 1 and 2, there is shown a cross-roller bearing which is less in weight and downsized in construction and further convenient to use in the rocking and/or swiveling systems of a diversity of machinery as recited earlier. Outer and inner rings 1 and 2 are each made in one-piece construction. The one-piece outer and inner rings 1 and 2 have raceway surfaces 17 and 19, respectively, to define a circular track or Load race between them. Either the raceway surfaces 17 and 19 has a loading hole 5 that allows insertion of short straight rollers 3 and separators 4 into the circular track or load race. With the embodiment illustrated here, the loading hole 5 is made in the outer ring 1 because of probably easier than in the counterpart to load the miniature rollers 3 and separators 4 into the circular track. The outer and inner rings 1 and 2 are combined together for relative circular movement with one another by virtue of the rollers 3.

Figure 5:
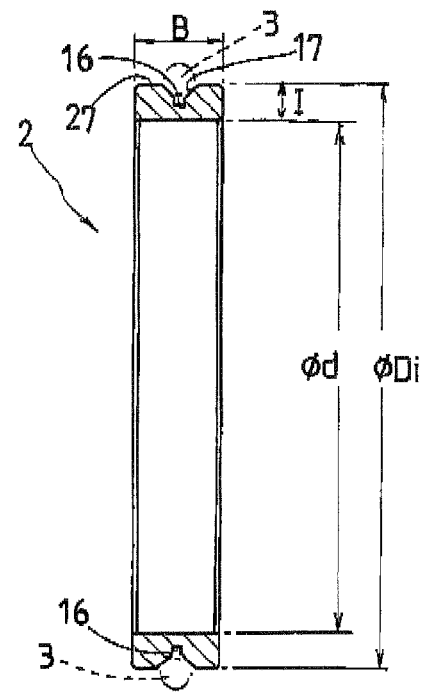
FIG. 5 is a view in transverse section of an inner ring in the ultrathin cross-roller bearing of FIG. 2.
Figure 6:
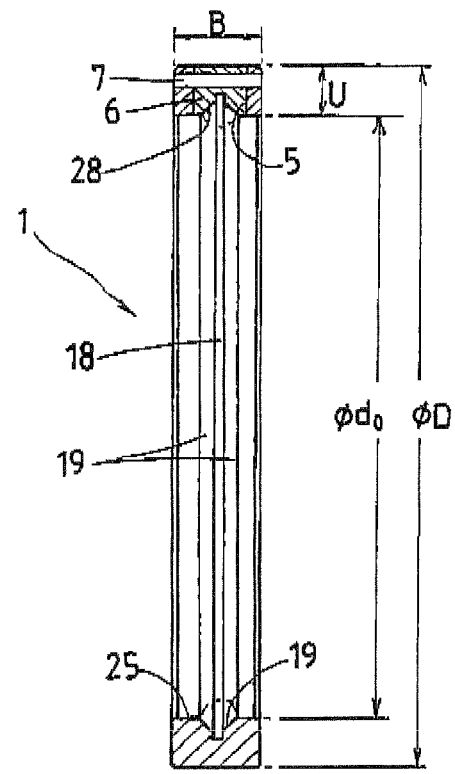
FIG. 6 is a view in transverse section of an outer ring in the ultrathin cross-roller bearing of FIG. 2.

The loading hole 5 in the outer ring 1 is a circular through-hole bored at least one location around an outside circular surface 25 of the outer ring 1 to reach the raceway surface 19. The outer ring 1 has the raceway surface 19 of V-shape in transverse section, which extends circularly along an inside circular surface 25 of the outer ring 1. Widthwise midway of the V-shaped raceway surface 19, there is cut deep a relief groove 18 to avoid interference of a grinding tool, not shown, with the raceway surface 19. Around an outside circular surface 27 of the inner ring 2 is provided the raceway surface 17 of V-shape in transverse section in opposition to the raceway surface 19 inside the outer ring 1. Widthwise midway of the V-shaped raceway surface 17, there is also cut deep a relief groove 16 to avoid interference of a grinding tool, not shown, with the raceway surface 17. The V-shaped raceway surface 19 inside the outer ring 1 as shown in FIG. 6 is circularly split into paired raceway surface halves 19 which are on opposite sides of the relief groove 18 at right angles relative to each other, while the V-shaped raceway surface 17 outside the inner ring 2 as shown in FIG. 5 is circularly split into paired raceway surface halves 17 which are on opposite sides of the relief groove 16 at right angles relative to each other.

Figure 3:
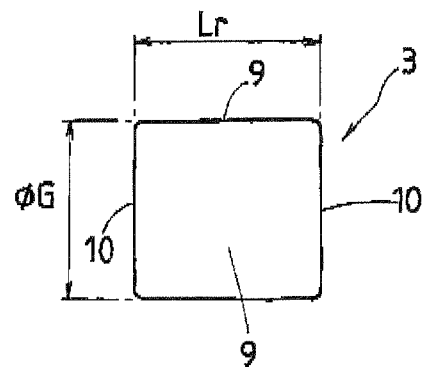
FIG. 3 is a view in front elevation of a, roller to be incorporated in the ultrathin cross-roller bearing of FIG. 1.

The cylindrical rollers 3 serving as rolling element are inserted or charged sequentially through the loading hole 5 of the outer ring 1 into the circular race between the raceway surfaces 17 and 19 in a fashion that any two adjacent rollers are oppositely inclined with their own axes intersecting one another at right angles relative to each other. Moreover, the cylindrical rollers 3 as especially shown in FIG. 3 are each made to have a diameter and an axial length which are approximately equal in dimension with each other. The separators 4 are each interposed between any two adjoining rollers 3 to travel together with the rollers 3 through the race between the raceway surfaces 17 and 19. The roller bearing in which any two adjacent rollers 3 lying on opposite sides of the separator 4, one to each side, are disposed to intersect at right angles relative to each other can permit every load of radial load, thrust or axial load and moment of load.

After the rollers 3 together with the separators 4 have been charged through the loading hole 5 of the outer ring 1 into the circular race defined between the raceway surfaces 17 and 19 of the outer and inner rings 1 and 2, a plug 6 fits into the loading hole 5 for closure. The plug 6 in the loading hole 5 is fixedly secured by means of a locking pin 7 extending in parallel with the axial direction of the outer ring 1. The plug 6 has a raceway surface 28 extending in flush with the raceway surface 19 inside the outer ring 1 to make sure of smooth rolling of the rollers 3. The locking pin 7 extends from any one of sides 8 of the outer ring 1 to the other side across the plug 6 to secure the plug 6 to the outer ring 1.

With the cross-roller bearing constructed as stated earlier, there is formed a circular clearance E between the inside circular surface 25 around the outer ring 1 and the outside circular surface 27 around the inner ring 2 to make certain of the circular track or load race defined between raceway surfaces 17 and 19 to allow the rollers 3 together with the separators 4 to run through there. Moreover, any tool, not shown, to undo the plug 6 out of the loading hole 5 can get easy access to the plug 6 with the help of the circular clearance E. In order to take the plug 6 away from the loading hole 5 of the outer ring 1, especially, the tool is introduced underneath the rollers 3 through the circular clearance E to urge the roller 3 just below the plug 6 upwards to get the roller 3 prominent above the outside circular surface 20 around the outer ring 1. Eventually, the plug 6 is ready for removal out of the cross-roller bearing. In the embodied example, the inside diameter d0 of the outer ring 1 was 35.3 mm while the outside diameter Di of the inner ring 2 was 34.1 mm. Thus, the clearance E was determined to be (35.3−34.1)/2=0.6 mm.

The less the clearance E left between the outer and inner rings is, the better it is for the raceway surfaces 17, 19 larger in width so as to permit heavy loads. But when there is left substantially no clearance E between the outer and inner rings, it will be not generally practical to observe whether the rollers run in right posture in the race and/or manipulate the plug 6 for removal away from the loading hole 5. In the embodied example, the clearance E was 0.6 mm because the clearance E below 0.6 mm excluded the tool to undo the plug 6 out of the loading hole 5 from insertion through the clearance E into the race.

With the cross-roller bearing having a plurality of, especially an even number of the cylindrical rollers 3 lying between the circular raceways 17 and 19 in geometry that their axes are alternately oblique in opposite directions at right angles each other, one of two adjacent rollers 3 oblique oppositely to each other comes into rolling contact at the circular rolling-surface 9 thereof with both one half of the paired raceway surface halves 19 inside the outer ring 1 and one half of the paired raceway surface halves 17 lying around the inner ring 2 opposite to the one half of the raceway surface halves 19 of the outer ring 1, thereby undergoing loads on line contact with the raceway surfaces 17 and 19. The other of two adjacent rollers oblique oppositely comes into rolling contact at the circular rolling-surface 9 thereof with the other half of the paired raceway surface halves 19 inside the outer ring 1 as well as the other half of the paired raceway surface halves 17 lying around the inner ring 2 opposite to the other half of the raceway surface halves 19 of the outer ring 1, thereby undergoing loads on line contact with the raceway surfaces 17 and 19. Axially opposite end surfaces 10 of the roller 3 are on to the raceway surface halves 17 and 19, which intersect at right angles with the raceway surfaces halves 17 and 19 that are in rolling contact with the circular rolling-surface 9 of the roller 3. The raceway surface halves 17 and 19 each face any one of the axially opposite ends of the roller 3 with leaving a bit of clearance between them. Referring to FIG. 3, there is shown the roller 3 having the circular rolling-surface 9 of an axial length Lr substantially equivalent to a diametral length G. More exactly, the axial length Lr of the circular rolling-surface 9 is determined to be slightly shorter than the diametral length G. The axially opposite end surfaces 10 of the cylindrical roller 3 are determined in dimension so as to move without getting clogged through between the confronting curved raceway surfaces 17 and 19, more especially, between the convexly curved raceway surface 17 around the inner ring 2 and the concavely curved raceway surface 19 inside the outer ring 1. As a result of the dimension as stated earlier, the rollers 3 are allowed to roll through between the raceway surfaces 17 and 19 without getting toppled on wobbled in their posture. Namely, the roller 3 is made to have the diameter and axial length, which are approximately same in ratio or substantially identical with each other.

Figure 4:
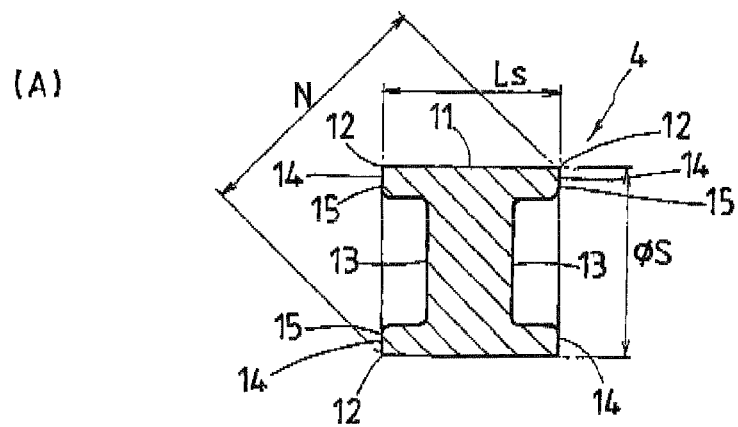
FIG. 4 is a view showing a separator to be interposed any two adjoining rollers as illustrated in FIG. 1, in which (A) is a view in axially transverse section, and (B) is a view in perspective.
Figure 4:
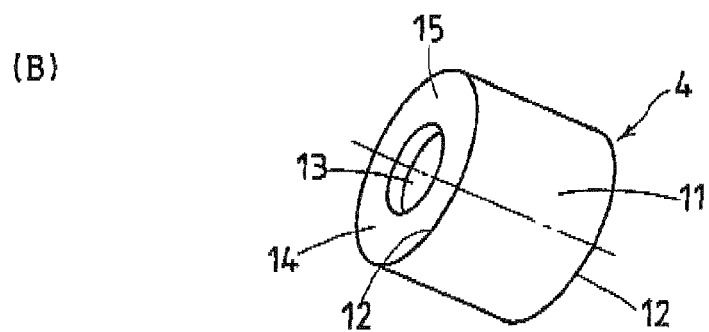

Referring to FIG. 4, there is shown the separator 4 to be interposed between any two adjacent rollers 3. The separator 4 is in the form of right circular cylinder and flanked with the rollers 3 in geometry that axially opposite ends 14 thereof come into abutment against the circular rolling-surfaces 9 of the rollers 3. Although but just one separator 4 is shown lying between the rollers 3 in the illustrative version, it will be appreciated that more than one roller 3 may be used in succession between the adjacent rollers 3. The separator 4 features a specific configuration as shown in FIG. 4, which is best adapted for downsizing of the cross-roller bearing when interposed between the adjacent rollers 3. The detail of the separator 4 will be explained later.

The cross-roller bearing of the present invention is most useful for the cantilever construction and, therefore, greater in freedom of design, compact or slim in construction, and further contributing to less space. As a result, the cross-roller bearing is most adaptive for the swiveling and/or rocking components of miniaturized industrial robots, optical instruments, and so on. Moreover, the inner ring 2 to fit over a shaft has an inside diameter of from 20 mm to 50 mm while a transverse section CS of the mating parts of the outer 1 and inner rings 2, as shown in FIG. 2, is reduced significantly in construction. The transverse section. CS is given by B×H, where B=an axial width or a bearing width of the mating outer and inner rings 1, 2, and H=a radial height across the mating outer and inner rings 1, 2 in transverse section. The cross-roller bearing of the present invention allows using the rollers 3 which are as very small in diameter as having found no application in the conventional cross-roller bearings. Especially, the version illustrated in FIG. 3 used the roller 3 having the diameter G of 2 mm.

With the cross-roller bearing illustrated in FIG. 3, the radial height H across the mating outer and inner rings 1, 2 in transverse section is given by an equation H=(D−d)/2, where D=an outside diameter of the outer ring 1, and d=an inside diameter of the inner ring 2. A preferred embodiment of the cross-roller bearing constructed according to the present invention was made miniature and lightweight in construction having the radial height H in transverse section shrinking down to 5.5 mm and the bearing width B of 5.0 mm. The selection of four types of the cross-roller bearing depended upon the inside diameter d of the inner ring 2: 20 mm, 30 mm, 40 mm and 50 mm.

More especially, the cross-roller bearing with the inside diameter d of 20 mm had the roller diameter G of 2 mm, the bearing width B of 5 mm, the radial height in transverse section H of 5.5 mm, and consequently the transverse section CS (=B×H) of 27.5 mm.

Other three types of the cross-roller bearing with the inside diameter d of 30 mm, 40 mm and 50 mm were also made to have the same dimensions as recited above in the inside diameter d of 20 mm, namely, the roller diameter G of 2 mm, the bearing width B of 5 mm, the radial height in transverse section H of 5.5 mm, and the transverse section CS (=B×H) of 27.5 mm.

Moreover, the cross-roller bearings constructed as stated earlier weighed 32.3 g or less even larger type. Especially, the cross-roller bearings with the inner rings 2 whose the inside diameter d was 20 mm, 30 mm, 40 mm and 50 mm, respectively, weighed 14.8 g, 20.7 g, 26.5 g and 32.3 g.

Figure 7:
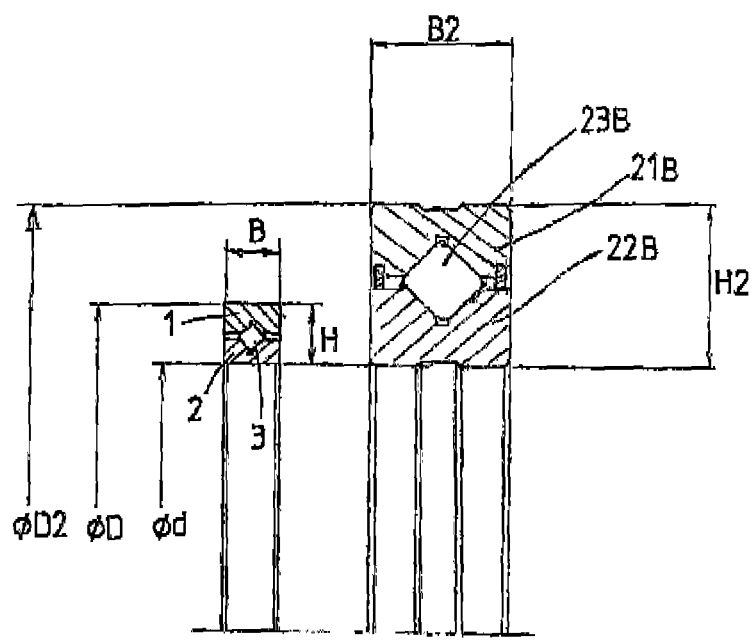
FIG. 7 is a fragmentary view in transverse section to illustrate the ultrathin cross-roller bearing of the present invention in comparison with a prior version 1 and another prior version 2.

The cross-roller bearing of the present invention as shown in FIG. 7 was designed for ultrathin configuration, especially, of which the transverse section CS was very small in dimension. In FIG. 7, there is illustrated the transverse section of the cross-roller bearing of the present invention whose the inside diameter d is 50 mm in comparison with prior versions 1 and 2 of relatively slim construction having the same inside diameter. The prior version 1 is one example of thin or slim construction while another prior version 2 is one example of highly rigid construction. The outer ring, inner ring and roller in the prior version 1 are labeled 21A, 22A and 23A while the outer ring, inner ring and roller in another prior version 2 are labeled 21B, 22B and 233. The inside diameters of the prior versions 1 and 2 are identical with the inside diameter d of the cross-roller bearing of the present invention whereas the outside diameters are labeled D, D1 and D2, respectively.

The product of the present invention has the inside diameter d, outside diameter D, bearing width B and the radial height H in transverse section, while the product of the prior version 1 has the inside diameter d, outside diameter D1, bearing width B1 and the radial height H1 in transverse section, and the product of another prior version 2 has the inside diameter d, outside diameter D2, bearing width B2 and the radial height H2 in transverse section. Quantitative data in every product was as follows (shown in mm):
The product of the present invention;
D=61, B=5, H=5.5

The product of the prior version 1;
D1=66, B1=8, H1=8
The product of another prior version 2;
D2=80, B2=13, H2=15.

Referring to FIG. 4, there is shown the separator 4 of right cylinder. The separator 4 has a specific configuration better to minimize the twisting or wobbling that might otherwise take place between the rollers 3, thereby making sure of revolving and/or swiveling performance of the bearings to universally follow or respond to clockwise and/or counter-clockwise rotation of, for example, robot arm. The separator 4 as illustrated with a broken line in FIG. 2 loosely fits in the circular race defined between the raceway surfaces 17 and 19. Especially, the separator 4 has an outside diameter S slightly smaller than the diameter G of the roller 3. The separator 4 is flanked by the rollers 3 inside the circular race in geometry that axially opposite ends 14 come into abutment against their associated rollers 3. Thus, the separator 4 will undergo the twisting forces on the axially opposite ends 14 thereof from the rollers 3 in directions perpendicular to each other, whether clockwise or counter-clockwise rotation. The right cylinder of the separator 4 has an axial length Ls which is selected in a way a diagonal dimension N is equal or more than the diameter of the roller 3 to keep the separator 4 against twisting or wobbling in the circular race. The separator 4 in the embodied design was made to have the diagonal dimension N of 2.34 mm.

Obviously, the separator 4 is designed to be smaller in size than the roller 3 of 2 mm. The separator 4 constructed so smaller than ever as stated earlier gets much interference in posture control from the dimensional variations, albeit slightly, and largely vulnerable to the force exerted from the rollers 3 under the clockwise and/or counter-clockwise rotation or rocking motion. To cope with this, the embodied example of the separator 4 was designed as follows for steady rotation and rocking motion.

(1) The separator 4 took the form of right cylinder large in axial length enough to get rid of any wobbling or varying in posture, making certain of steady rolling performance while rolling through between the raceway surfaces 17 and 19, whether forward or reverse turning operation. In order to keep the separator 4 of which the diameter S was slightly smaller than the diameter G of the roller 3 against wobbling or twisting while rolling through between the raceway surfaces 17 and 19, more especially, the separator 4 was in the form of a four-sided shape as shown in longitudinal section in FIG. 4, in which a diagonal line joining two opposite corners 12 where the axially opposite ends 14 intersected with a circular outside surface 11 had the diagonal dimension N substantially larger than the diameter G of the roller 3. The diagonal dimension N was determined depending upon the axial length Ls of the right cylinder of the separator 4. Thus, the axial length Ls of the separator 4 should be defined as $Ls > (G^2 - S^2)^{1/2}$.

(2) The axially opposite ends 14 of the separator 4 were each recessed at 13, leaving an annular flat area 15. The circular corners 12 were not chamfered, but edged at right angles. The separator 4 was made from synthetic resins such as polyacetal, which was processed with injection molding. The separator 4 with axially opposite ends 14 recessed at 13 and edged with the circular corners 12 was less in dimensional variation from product to product and, therefore, could be fabricated with high accuracy. In the separator 4 constructed as stated earlier, the circular flat area 15 surrounding around the recess 13 spread perpendicular to the circular surface 11 to come into steady sliding engagement with the rolling-surface 9 around the roller 3. More especially, the axially opposite ends 14 were made therein with the large recesses 13 which were surrounded with the annular flat areas 15. The flat area 15 lying evenly around the periphery of the recess 13 helped make sure of constant sliding-engagement with rolling-surface 9 of the roller 3. The annular flat area 15 had a dimension desired to have rigidity or stiffness tolerable against any force exerted from the roller 3 as well as wear proof. The cross-roller bearings were usually lubricated with grease. The recesses 13 on the axially opposite ends of the separator 4 served as oil reservoirs to perform efficiently the maintenance-free for lubrication. Although there was no oil hole to feed the cross-roller bearing with the lubricant, the clearance left between the outer and inner rings 1 and 2 might be used to provide easy but positive application as required.

As seen in FIGS. 2, 5 and 6, a radial thickness of the outer ring 1 refers to a height U in transverse section of the outer ring 1 while a radial thickness of the inner ring 2 refers to a height I in transverse section of the inner ring 2. The height U in transverse section of the outer ring 1 is 1.4 times as thick as the height I in transverse section of the inner ring 2. In an embodied example, the height U of the outer ring 1 was 2.85 mm while the height I of the inner ring 2 was 2.05 mm and therefore the ratio in thickness of the outer ring 1 to the inner ring 2 was 1.4 (=2.85/2.05).

With the cross-roller bearing in the embodied example having the ultrathin height H in transverse section of 5.5 mm, the bearing width B was 5 mm while the radial thickness I of the inner ring 2 could be reduced to the minimum, especially, I=2.05 mm.

The outer ring 1 relatively large in the radial thickness U is preferred for accurate and steady mounting in the housing, not shown, making certain of rigid mounting of the bearing with keeping better rotating performance. Moreover, the outer ring 1 relatively large in the radial thickness U is in favor of the large loading hole 5 easier in introduction of the roller 3 into the race, and further helping getting the accurate plug 6 to close the loading hole 5. The outer ring 1 constructed as stated earlier gets it easier to make the loading hole 5 to introduce the rollers 3 together with the separators 4 into the race, the plug 6 to seal the loading hole 5, and locking pin 7 accurately in shape in relation to one another. Thus, the outer ring 1 adapted for rigid mounting makes it easier to mount the bearing in the housing and ensure steady or constant rotation of the bearing.

All the outer and inner rings 1 and 2, plug 6 and rollers 3 are made of hardened high-carbon bearing Cr-steel (SUJ2), while the separator 4 is made from synthetic resins such as polyacetal. The pin 7 to lock the plug 6 in the outer ring 1 is made of SUS. The plug 6 is worked at its outside surface 24 by finish-cutting done at a time simultaneously with the cutting of the outside circular surface 20 of the outer ring 1 while its inside circular surface 26 by finish-cutting done at the same time with the cutting of the inside circular surface 25 of the outer ring 1. The plug 6 worked as stated earlier fits into the loading hole 5 in a fashion its outside surface 24 sinks deep below the outside circular surface 20 while its outside circular surface 27 is in flush with the inside circular surface 26 of the outer ring 1.

What is claimed is:

1. A cross-roller bearing comprising:
an outer ring provided on an inside circular surface thereof with a raceway surface of V-shape in a transverse section,
an inner ring provided on an outside circular surface thereof with a raceway surface of V-shape in a transverse section in opposition to the raceway surface of the outer ring, the inner ring lying inside the outer ring for circular movement relatively to the outer ring,
a plurality of rollers inserted through a loading hole, which is in the outer ring, in between the opposed raceway surfaces in a fashion such that two adjacent rollers are in oblique opposition to each other and have axes intersecting with one another at right angles, and
separators interposed between any two adjacent rollers,
wherein the outer ring and the inner ring are each made in one-piece construction;
wherein the roller has an axial length and a diameter, which are substantially identical with one another and the roller has the diameter of 2 mm;
wherein the cross-roller bearing has a radial height H in a transverse section of H=(D-d)/2=5.5 mm, where D=an outside diameter of the outer ring and d=an inside diameter of the inner ring, and has a bearing width B of 5 mm,
wherein the outer ring has a radial thickness or a height (U) in a transverse section of U=(D-do)/2, where do=an inside diameter of the outer ring, and the inner ring has a radial thickness or a height (I) in a transverse section of the inner ring of I=(Di-d)/2, where Di=an outside diameter of the inner ring, the radial thickness U of the outer ring being 1.4 times as thick as the radial thickness (I) of the inner ring,
wherein a plug fits into the loading hole in the outer ring and a clearance (E) of E=(do-Di)/2=0.6 mm is provided between the inside diameter (do) of the outer ring and the outside diameter (Di) of the inner ring for allowing the plug to disengage from the loading hole,
wherein the separator has a circular cylinder and two axially opposite flat ends which come into abutment against circular rolling surfaces of the rollers,
wherein the axially opposite flat ends of the separator have at middle areas thereof recesses surrounded with annular flat areas, and circular edges between the annular flat areas of the axially opposite ends and the circular cylinder of the separator are at right angles to one another,
wherein the separator has an outside diameter (S) smaller than the diameter (G) of the roller and fits loosely between the raceway surfaces and further the separator has a diagonal dimension (N) larger than the diameter of the roller to keep the separator against twisting or wobbling between the raceway surfaces and an axial length (Ls) of $Ls > (G^2 - S^2)^{1/2}$,
wherein the recesses of the separator functions as lubricant reservoirs, and
wherein the cross-roller bearing has the radial height H=5.5 mm and the bearing width B=5 mm, and the inner ring having the inside diameter d selected from 20 mm, 30 mm, 40 mm and 50 mm.

* * * * *